United States Patent
Barker (10) Patent No.: US 9,959,298 B2
(45) Date of Patent: May 1, 2018

(54) METHOD, APPARATUS AND SYSTEM FOR INDEXING CONTENT BASED ON TIME INFORMATION

(71) Applicant: THOMSON LICENSING, Issy de Moulineaux (FR)

(72) Inventor: Louis Kirk Barker, Rockwall, TX (US)

(73) Assignee: THOMSON Licensing, Issy-les-Moulineaux (FR)

( * ) Notice: Subject to any disclaimer, the term of this patent is extended or adjusted under 35 U.S.C. 154(b) by 352 days.

(21) Appl. No.: 14/649,230

(22) PCT Filed: Dec. 18, 2012

(86) PCT No.: PCT/US2012/070313
§ 371 (c)(1),
(2) Date: Jun. 3, 2015

(87) PCT Pub. No.: WO2014/098804
PCT Pub. Date: Jun. 26, 2014

(65) Prior Publication Data
US 2015/0317341 A1    Nov. 5, 2015

(51) Int. Cl.
*H04N 9/80* (2006.01)
*H04N 5/93* (2006.01)
(Continued)

(52) U.S. Cl.
CPC ...... *G06F 17/30312* (2013.01); *G11B 27/034* (2013.01); *G11B 27/105* (2013.01); *G11B 27/28* (2013.01); *G11B 27/323* (2013.01)

(58) Field of Classification Search
USPC ................................................ 386/278, 248
See application file for complete search history.

(56) References Cited

U.S. PATENT DOCUMENTS

| 8,051,446 | B1 * | 11/2011 | Qian | ................. G06F 17/30837 |
| | | | | 715/719 |
| 8,522,300 | B2 * | 8/2013 | Relyea | .................... G07F 17/32 |
| | | | | 463/4 |

(Continued)

FOREIGN PATENT DOCUMENTS

| JP | 2007288697 | 11/2007 |
| JP | 2008072232 | 3/2008 |

(Continued)

*Primary Examiner* — Nigar Chowdhury
(74) *Attorney, Agent, or Firm* — Brian J. Dorini; Robert D. Shedd (57) ABSTRACT

There is provided a method, apparatus and system for indexing content based on relative time information. The method, apparatus and system include determining relative time information of at least one of a time interval of at least a portion of the content and an event occurring in the content, generating time metadata that indexes in absolute time the determined relative time information and communicating the time metadata for storage. The method, apparatus and system can further include receiving a request for the at least one of a time interval of at least a portion of the content and an event occurring in the content, the request identifying a desired content portion using relative time information, using the time metadata to determine a portion of the content relative to the time information and communicating the content portion relative to the time information to a requester.

25 Claims, 5 Drawing Sheets (51) Int. Cl.
*G11B 27/00* (2006.01)
*G06F 17/30* (2006.01)
*G11B 27/034* (2006.01)
*G11B 27/10* (2006.01)
*G11B 27/28* (2006.01)
*G11B 27/32* (2006.01)

(56) References Cited

U.S. PATENT DOCUMENTS

| | | |
|---|---|---|
| 2003/0177503 A1 | 9/2003 | Sull et al. |
| 2003/0185620 A1* | 10/2003 | Park .................. A46B 11/0055 401/270 |
| 2006/0014585 A1* | 1/2006 | Neogi .............. H04N 21/23412 463/42 |
| 2008/0140232 A1* | 6/2008 | Lee .................... G06K 9/00718 700/91 |
| 2008/0282293 A1* | 11/2008 | Frechter ................ H04N 7/163 725/58 |
| 2008/0300871 A1* | 12/2008 | Gilbert .................... G10L 15/20 704/233 |
| 2010/0054691 A1 | 3/2010 | Takayama et al. |
| 2010/0194892 A1 | 8/2010 | Hikita et al. |
| 2011/0099195 A1* | 4/2011 | Patwardhan ........ G06F 17/3084 707/769 |
| 2011/0246495 A1* | 10/2011 | Mallinson ........ G06F 17/30026 707/758 |
| 2012/0237182 A1* | 9/2012 | Eyer ...................... H04N 5/783 386/241 |
| 2014/0064693 A1* | 3/2014 | Deshpande .......... H04N 9/8205 386/230 |
| 2017/0161284 A1* | 6/2017 | Chipman .......... G06F 17/30058 |

FOREIGN PATENT DOCUMENTS

| | | |
|---|---|---|
| JP | 2009225483 | 10/2009 |
| JP | 2010183302 | 8/2010 |
| WO | WO2007073347 | 6/2007 |

* cited by examiner

METHOD, APPARATUS AND SYSTEM FOR INDEXING CONTENT BASED ON TIME INFORMATION

TECHNICAL FIELD

This application is a National Stage Application and claims the benefit, under 35 U.S.C. § 365 of International Application PCT/US2012/070313 filed Dec. 18, 2012 which was published in accordance with PCT Article 21(2) on Jun. 26, 2014 in English.

BACKGROUND

Media content such as video content has timestamps associated with the content where such timestamps are transmitted as part of the video content itself. The problem with real time content is that such timestamp information can be irrelevant when the game clock for a sporting event, for example, is not synchronized to real time. For example, for an American Football game, the game can take place over three hours while the game clock is only for an hour. Hence, timestamps (e.g., such as a Presentation Time Stamp for an MPEG-2 stream) generated at a broadcast center can be meaningless if a user is interested in accessing the last "5 minutes" of a game, according to a game clock, and not to real time.

SUMMARY

These and other drawbacks and disadvantages of the prior art are addressed by the present principles, which are directed to the indexing of content based on relative time information.

According to one embodiment of the present invention, a system for indexing content includes a device for determining relative time information of at least one of a time interval of at least a portion of the content and an event occurring in the content, a metadata determination device for generating time metadata that indexes in absolute time the determined relative time information and a transmitter for communicating the time metadata for storage. In alternate embodiments of the present invention, the system can further include a user input device for receiving user inputs regarding relative time information and an optical character recognition device for applying an optical character recognition technique to the content for determining relative time information.

In an alternate embodiment of the present invention, a method for indexing content includes determining relative time information of at least one of a time interval of at least a portion of the content and an event occurring in the content, generating time metadata that indexes in absolute time the determined relative time information and communicating the time metadata for storage. In alternate embodiments of the present invention, the method can further include receiving a request for the at least one of a time interval of at least a portion of the content and an event occurring in the content, the request identifying a desired content portion using relative time information and using the time metadata to determine a portion of the content relative to the time information. Alternatively, the method can further include communicating the content portion relative to the time information of the request to a requester and reproducing on a reproduction device at least one of, the at least one predetermined time interval that is indexed based on the time metadata and the at least one predetermined event that is indexed based on the time metadata. Even further, the method can optionally include using electronic program guide information to identify a source of the relative time information.

In an alternate embodiment of the present invention, there is provided a computer readable storage medium including a computer readable program for indexing content for an event. The computer readable program when executed on a computer causes the computer to perform at least the steps of determining relative time information of at least one of a time interval of at least a portion of the content and an event occurring in the content, generating time metadata that indexes in absolute time the determined relative time information and communicating the time metadata for storage. The computer readable storage medium can further cause the performance of steps including receiving a request for the at least one of a time interval of at least a portion of the content and an event occurring in the content, the request identifying a desired content portion using relative time information, using the time metadata to determine a portion of the content relative to the determined time information and communicating the content portion relative to the determined time information to a requester.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present invention advantageously provides a method, apparatus and system for indexing content for an event based on time information. Although the present invention will be described primarily within the context of time information in sporting events, the specific embodiments of the present invention should not be treated as limiting the scope of the invention. It will be appreciated by those skilled in the art and informed by the teachings of the present invention that the concepts of the present invention can be implemented using time information in substantially any media content in accordance with the present principles while maintaining the spirit of the present invention.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with various embodiments of the present invention, a method, apparatus and system provide an indexing technique for content on a storage device where the indexing is performed by determining time information from the content itself, instead of relying on external metadata. The techniques of the present invention can be applied to content that is generated in a live setting, such as a sports event, where timing from a broadcast center may not be relevant to, for example, a "game clock" for a sporting event presented by the content.

Figure 1:
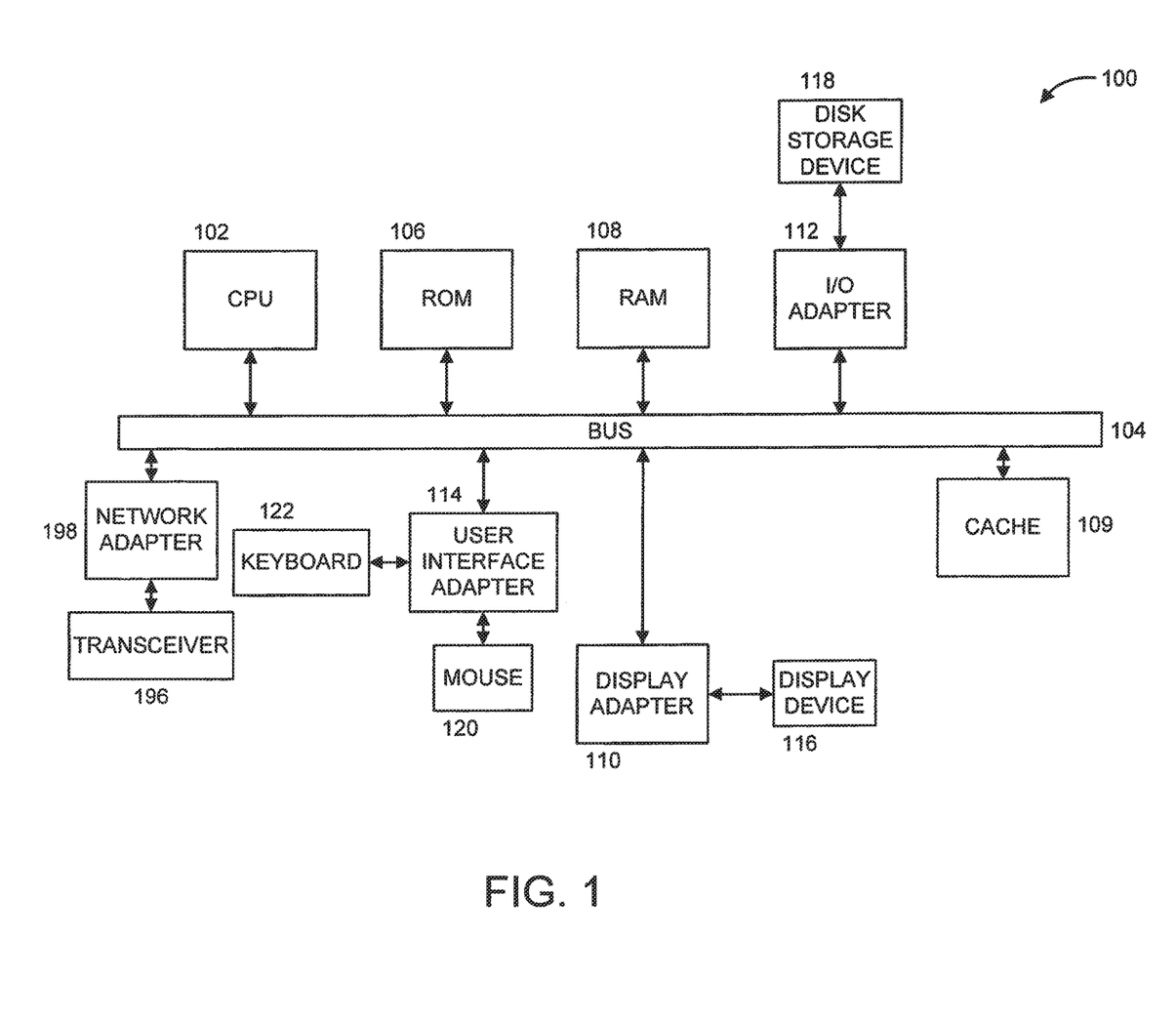
FIG. 1 depicts a high level block diagram of an apparatus for implementing the principles of the present invention, in accordance with an embodiment of the present invention.

FIG. 1 depicts a high level block diagram of an exemplary processing apparatus 100 for implementing the principles of the present invention, in accordance with an embodiment of the present invention. The processing apparatus 100 of FIG. 1 includes at least one processor (CPU) 102 operatively coupled to other components via a system bus 104. A read only memory (ROM) 106, a random access memory (RAM) 108, a display adapter 110, an input/output (I/O) adapter 112, a user interface adapter 114, and a network adapter 198, are operatively coupled to the system bus 104.

In the system of FIG. 1, a display device 116 is operatively coupled to the system bus 104 by display adapter 110. A disk storage device (e.g., a magnetic or optical disk storage device) 118 is operatively coupled to the system bus 104 by the I/O adapter 112. A mouse 120 and keyboard 122 are operatively coupled to the system bus 104 by the user interface adapter 214. The mouse 120 and keyboard 122 are used to communicate information with the system 100. In the embodiment of FIG. 1, a transceiver 196 is operatively coupled to the system bus 104 by a network adapter 198.

The system 100 may also include other elements (not shown), as readily contemplated by one of skill in the art, as well as omit certain elements. For example, various other input devices and/or output devices can be included in the system 100, depending upon the particular implementation of the same, as readily understood by one of ordinary skill in the art. For example, various types of wireless and/or wired input and/or output devices can be used for communication with, for example, a camera. Moreover, additional processors, controllers, memories, and so forth, in various configurations can also be utilized as readily appreciated by one of ordinary skill in the art. These and other variations of the apparatus 100 of FIG. 1 are readily contemplated by one of ordinary skill in the art given the teachings of the present principles provided herein.

Although the processing apparatus of FIG. 1 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software executed by a processor, hardware, or a combination thereof. In addition, the processing apparatus of FIG. 1 is depicted as a separate component, the functionalities of the server in accordance with the concepts and embodiments of the present invention described herein can be incorporated into an existing system component of, for example, the system 200 of FIG. 2.

Figure 2:
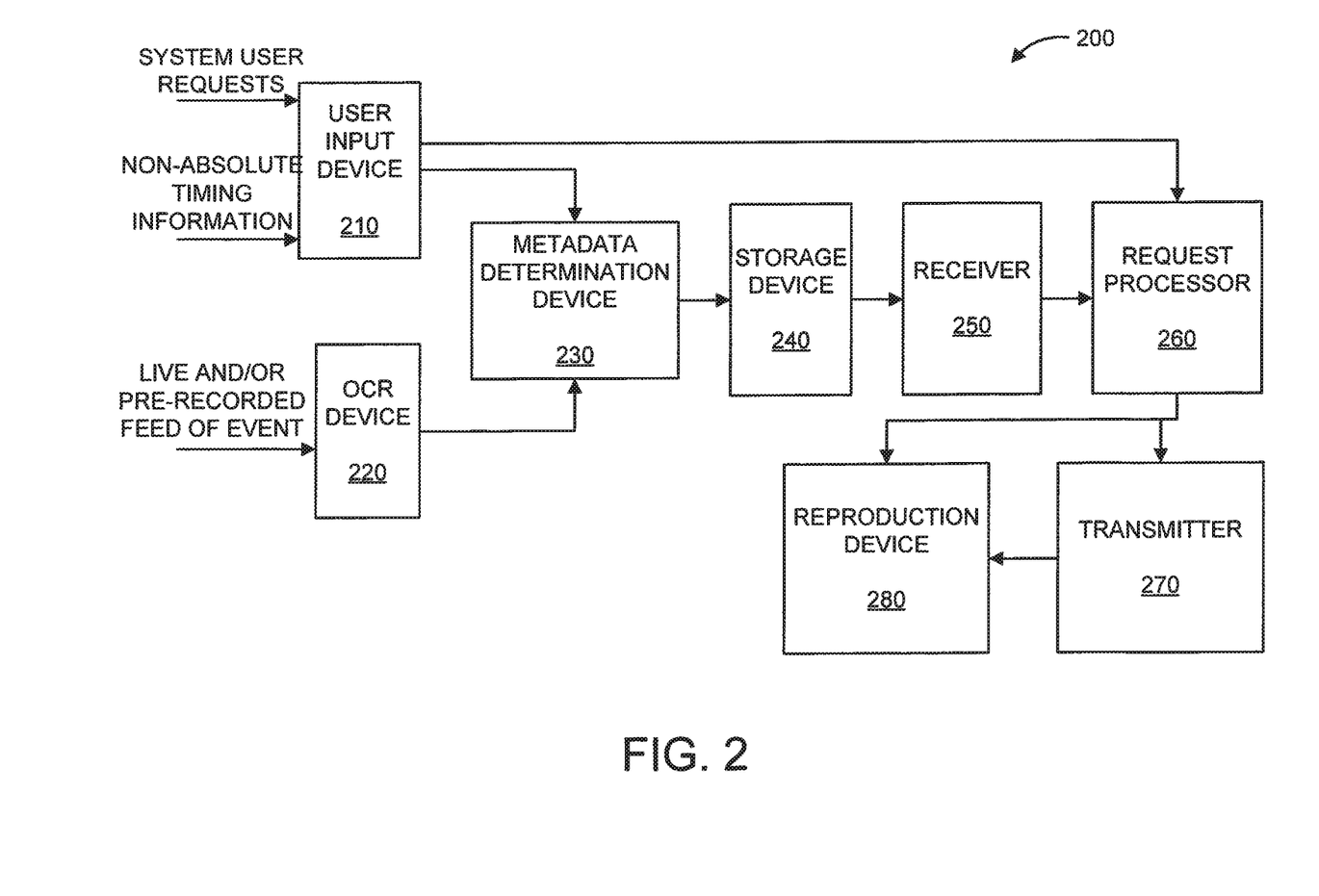
FIG. 2 depicts a high level block diagram of system for indexing content for an event based on time information in accordance with an embodiment of the present invention.

More specifically, system 200 described below with respect to FIG. 2 is a system for implementing respective embodiments of the present principles. Part or all of processing apparatus 100 may be implemented in one or more of the elements of system 200 of FIG. 2. Further, it is to be appreciated that processing apparatus 100 may perform at least part of the method described herein including, for example, at least part of method 300 of FIG. 3. Similarly, part or all of system 200 may be used to perform at least part of method 300 of FIG. 3.

FIG. 2 depicts a high level block diagram of system for indexing a time-based event in content based on time information in accordance with an embodiment of the present invention. The system 200 of FIG. 2 illustratively includes a user input device 210, an optical character recognition device 220, a metadata determination device 230, a storage device 240, a receiver 250, a request processor 260, a transmitter 270, and a reproduction device 280. Although in the embodiment of the system 200 of FIG. 2 the user input device 210, the optical character recognition device 220, the metadata determination device 230, the storage device 240, the receiver 250, the request processor 260, the transmitter 270, and the reproduction device 280 are depicted as separate elements, in alternate embodiments of the present invention, the components can comprise parts of the same overall device. For example, components of FIG. 2 can be embodied in a processing apparatus such as the apparatus 100 described above with respect to FIG. 1.

In one embodiment of the present invention, such as the embodiment of system 200 of FIG. 2, a user records non-absolute time information using the user input device 210, which can use wired and/or wireless technology. Such a user can be privy to such non-absolute time information by being present at the event in question and/or a by being at a broadcast center and/or from watching a recording of the event in question. For example, in one embodiment of the present invention, a person can be located at a broadcast center to note and insert, using a user input device, relevant time information about the progression of quarters in for example, an American football game. This information can be input as part of an auxiliary data that is included as part of video programming (such as EIA-708/closed captioning metadata) or as auxiliary data that is appended to an MPEG-2 transport stream. Alternatively, this information can be part of the broadcast by having metadata from a game clock used for the event added at the point of a broadcast center and is transmitted as part of the broadcast of a game. It should be noted that the phrase "non-absolute time information" used throughout these teachings should be considered as referring to relative time information based on events occurring in video programming/content and not based on time information based on the progression of the playing or viewing of the content.

In an alternate embodiment of the present invention, the creation of time information metadata as described above can be created automatically. For example and referring back to the system 200 of FIG. 2, the optical character recognition (OCR) device 220 applies an optical character recognition technique to live or recorded content, to determine the non-absolute time information. In the embodiment of FIG. 2, the metadata determination device 230 converts the non-absolute time information into time metadata, which can then be added to the video programming.

In embodiments of the present invention, the optical character recognition device 220 can be configured to determine the non-absolute time information provided from one or more pre-designated and expected areas in content where the non-absolute time information is typically provided. Thus, the optical character recognition device 220 can receive, for example, but is not limited to receiving, a live and/or pre-recorded feed of the event provided by, for example one or more cameras (not shown) and/or one or more storage devices. The aforementioned storage devices can be the same or different from the storage device 240 depicted in the embodiment of FIG. 2.

The metadata determination device 230 of the system 200 of FIG. 2 determines time metadata that indexes in absolute time at least one of, a predetermined time interval and a predetermined activity relating to an event in video content. The time metadata is determined from non-absolute time information that is based on at least one of conventional time intervals and conventional time of activities particular to the event. That is, for example a game clock of a sporting event can be indexed to real time to enable the referencing of events that occur in, for example a sporting event at specific times relevant to, for example a game clock, to absolute time for later reference. The conventional time intervals and the conventional time of activities particular to the event are different for different types of events. It should be noted that the use of the terms "metadata" and "time metadata" used throughout the teachings herein should be considered to refer to the indexing of the time information of an event in content (i.e., non-absolute time information) to an absolute time, for example the elapsed time of the playing the content or real time, unless otherwise defined.

The storage device 240 stores thereon at least one of, the time metadata, the at least one predetermined time interval that is indexed based on the time metadata, and the at least one predetermined activity that is indexed based on the time metadata. In various embodiments of the present invention, the storage device 240 can be located proximate to system 200, or can be remote therefrom. In an embodiment, the storage device 240 can be located at the location of a reproduction device, for example, at a home, at an establishment, at the event itself, and so forth. Thus, as is readily evident, there can be more than one storage device 240 included in or that otherwise interfaces with system 200. In such a case, one storage device 240 can be proximate to system 200 and used to process requests received by the request processor 260 described more fully herein below, and other storage devices 240 can be located at locations of reproduction of the event.

It should be noted that in alternate embodiments of the present invention, the plurality of devices depicted in the system 200 of FIG. 2 can be incorporated into a single device, such as a set top box (STB) or other personal recording device. Such device(s) can be located at establishments (e.g., bars, etc.) or as part of a server system that processes user requests. These and other embodiments are readily determined by one of ordinary skill in the art, given the teachings of the present principles provided herein.

Referring back to the system 200 of FIG. 2, a receiver 250 receives a user request for event information of content based on non-absolute time information and provides the user requests to the request processor 260. That is, in accordance with embodiments of the present invention, a user request can include a request for at least one of, a predetermined time interval and a predetermined activity in the content based on non-absolute time. Such requests are indexed based on the time metadata determined in accordance with the embodiment of the present invention described herein.

The transmitter 270 of FIG. 2 transmits to the user information regarding at least one of, the time metadata, the predetermined time interval, and the predetermined activity, responsive to the user request. Of course, in alternate embodiment of the present invention the transmitter 270 can transmit the entirety of the content for the event, as well as the time metadata, to enable local indexing and reproduction of the content or certain portions thereof at a user/viewer location.

The reproduction device 280 reproduces thereon at least one of, the predetermined time interval that is indexed based on the time metadata and the predetermined activity that is indexed based on the time metadata. The reproduction device 280 can be located proximate to system 200, or can be remote. For example, in an embodiment of the present invention, the reproduction device 280 can be located proximate to system 200, to ensure the reliability of the time metadata. In such a case, the transmitter 270 can be bypassed with the results of requests (e.g., provided to the system 200 via the user input device 210) initiated by a system user (e.g., a quality assurance person) provided locally to the system user on the reproduction device 280. In an alternate embodiment, one or more reproduction devices (e.g., one or more other reproduction devices than that shown in FIG. 2) can be located remote with respect to system 200, for example, at a home, at an establishment, at the event itself, and so forth. Thus, as is readily evident that in various embodiments of the present invention there can be more than one reproduction device 280 included in and/or that otherwise interfaces with system 200. These and other implementations of reproduction device 280 are readily determined by one of ordinary skill in the art, given the teachings of the present principles provided herein.

It should be noted that in alternate embodiments of the present invention, the system 200 may also include other elements (not shown), as readily contemplated by one of skill in the art, as well as omit certain elements. For example, the functions of receiver 250 and transmitter 270 can be combined and implemented by a transceiver. These and other variations of the system 200 are readily contemplated by one of ordinary skill in the art given the teachings of the present principles provided herein.

Figure 4:
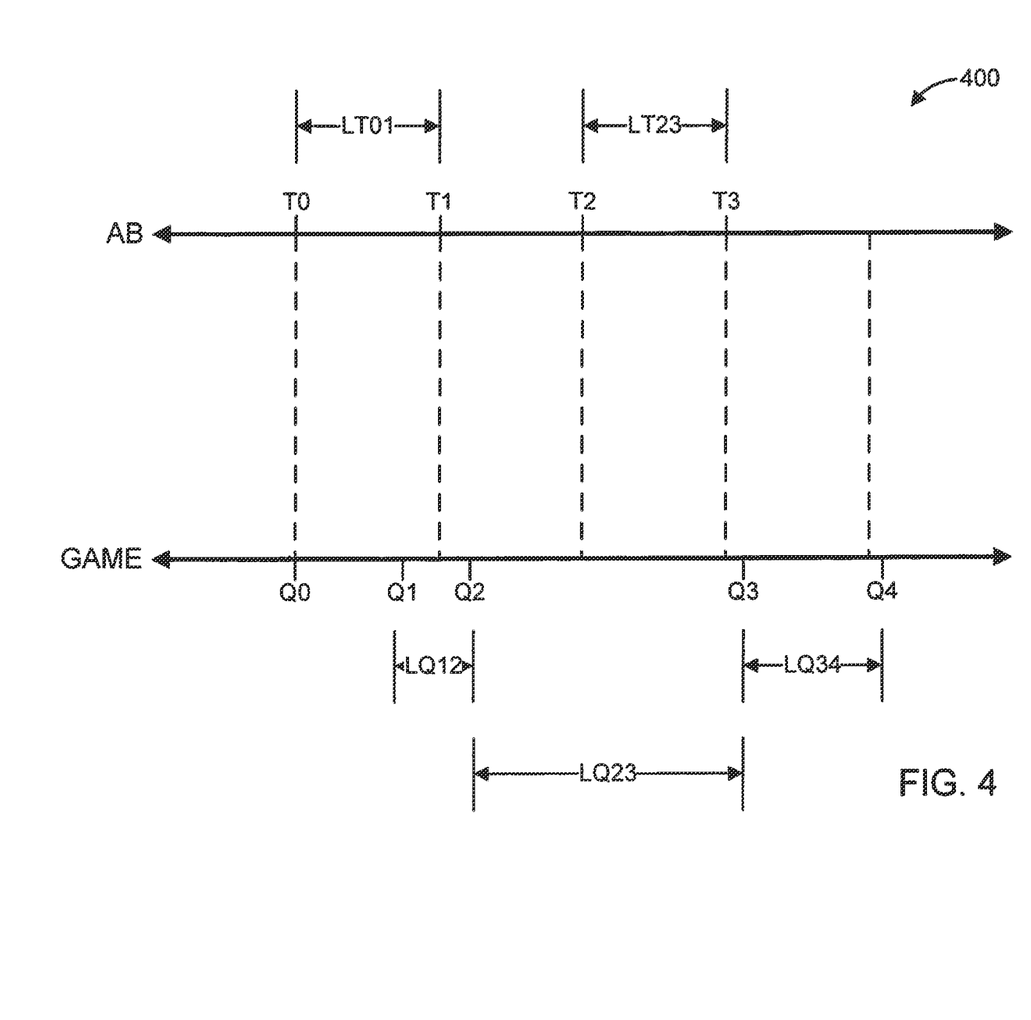
FIG. 4 depicts a timing diagram illustrating a difference between absolute time and non-absolute time for a sporting event, to which the present principles can be applied in accordance with an embodiment of the present invention.

FIG. 4 depicts a timing diagram illustrating a difference between absolute time and non-absolute time (i.e., time based on a game clock) for a sporting event, to which the present principles can be applied in accordance with an embodiment of the present invention. The sporting event of FIG. 4 can include, but is not limited to, any of a football game, a basketball game, a hockey game, a soccer game, a boxing match, and so forth. It is to be appreciated that the preceding listing of events is merely exemplary and not exhaustive.

Moreover, it is to be appreciated that while the present principles are primarily described herein with respect to sporting events for the sake of illustration, the present principles can be applied to any type of event where the timing thereof (whether in its entirety or portions thereof) cannot be readily predicted or recalled with reference to absolute time including weddings, and so forth, as readily contemplated by one of ordinary skill in the art, while maintaining the spirit of the present principles. Given the ever increasing content of reality television, the types of events to which the present principles can be applied are similarly ever increasing. For example, for the wedding example, a request for a specific portion of content can include, but is not limited to, the vows portion, the reception, the cake cutting portion, and so forth. It is to be appreciated that the preceding listing is merely exemplary and not exhaustive.

The exemplary timing diagram depicted in FIG. 4 is described with respect to two timelines, namely an absolute timeline and a non-absolute/game timeline. In FIG. 4, the absolute timeline is indicated by the reference letters "AB", while the game timeline is indicated by the term "game". In FIG. 4, the absolute timeline (AB) represents a real world timeline in which time stays constant between different time intervals. For example, the time interval (represented by time interval LT01) between time T0 and time T1 is the same as (i.e., is equal to) the time interval (represented by time interval LT23) between time T2 and time T3, namely 20 minutes.

In contrast, the game timeline (game) for a gaming event is broken up into different time intervals which are different lengths as compared to the time intervals of the absolute timeline (AB). For example, in the example of FIG. 4, the gaming event is broken up into an "hour" length game having 4 quarters (indicated by the reference characters Q01, Q12, Q23, and Q34) which according to the time of the game should consist of 15 minute intervals. It is apparent though that in reality that the length of such segments vary in size (compare, for example, time interval LQ12 versus time interval LQ34 on the game timeline) and may even be longer than 20 minutes (i.e., compare time interval LQ23 on the game timeline to LT01 or LT23 on the absolute timeline).

With these variations in the size of the time segments/ quarters for a game, it is impossible for a broadcaster to predict ahead of time when a quarter will begin or end. The present principles advantageously provide several solutions to create metadata that can be used for indexing video content, for example, for a gaming event, using time information of events occurring in the video content.

In accordance with embodiments of the present invention, to provide time information based on events occurring in video content, non-absolute time information for the video content is determined. For example and as described above, in a first exemplary embodiment of the present invention, a person can be used at a broadcast center to enter or record relevant metadata about the progression of quarters in a football game to the video content. For example, a person can enter information regarding what time is displayed on a game clock when points are scored in the game or when another significant event occurs in the football game. In addition, information regarding the relative time information of a game clock versus real time can be recorded.

Metadata regarding the time information noted/recorded is then generated. That is and as described above, time metadata that indexes in absolute time at least one of, a predetermined time interval and a predetermined activity relating to an event in video content is generated. The time metadata is determined from non-absolute time information that is based on at least one of conventional time intervals and conventional time of activities particular to an event. That is, for example a game clock of a sporting event can be indexed to real time to enable the referencing of events that occur in, for example a sporting event at specific times relevant to, for example a game clock, to absolute time for later reference. The generated metadata can then be communicated to a user along with the recorded content. That is, in various embodiments of the present invention, the metadata can be part of auxiliary data that comes as part of video programming (such as EIA-708/closed captioning metadata) or as auxiliary data that is appended to an MPEG-2 transport stream. Alternatively, this information can be part of the broadcast by having metadata, from a game clock used for the event, and added at the point of a broadcast center, transmitted as part of the broadcast of the game.

In a second exemplary embodiment of the present invention, the non-absolute time information for the video content and aforementioned metadata regarding the non-absolute time information for the video content is automatically created. In such an embodiment, the non-absolute time information for the video content is created by applying an optical character recognition (OCR) technique to the content. That is, in one embodiment of the present invention, a receiver or other device receiving the video content such as the processing apparatus of FIG. 1 applies an OCR technique to the video content to determine non-absolute time information of the video content. As described above, in various embodiments of the present invention, portions of the video content can be predefined as possibly containing the non-absolute time information and as such the OCR technique can be limited to such predefined areas. The determined non-absolute time information can be used to generate the metadata as described above.

Figure 5:
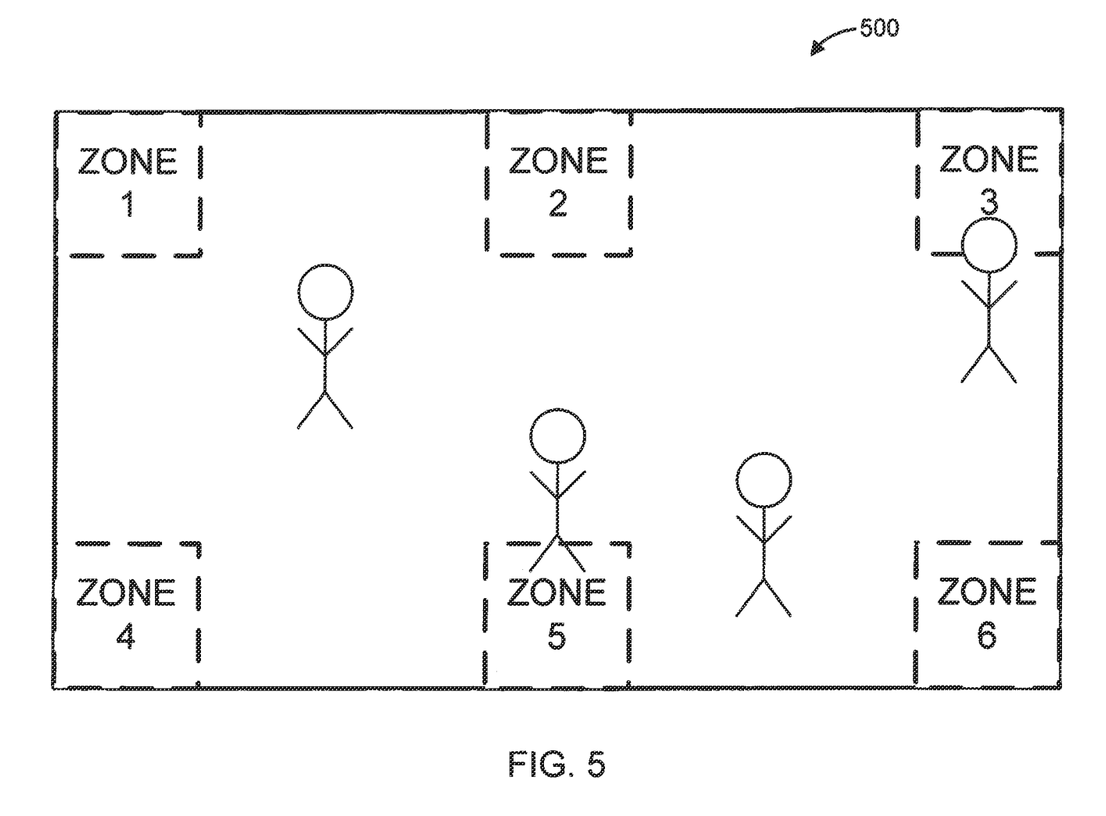
FIG. 5 depicts an exemplary application of an optical character recognition (OCR) technique, in accordance with an embodiment of the present invention.

FIG. 5 depicts an exemplary application 500 of an optical character recognition (OCR) technique, in accordance with an embodiment of the present invention. In one embodiment of the present invention, the OCR technique is focused on areas in the video content commonly used for presenting a game clock. For example, in FIG. 5, some of these commonly used zones are indicated as zones 1 through 6.

In various embodiments of the present invention, the OCR technique can further perform a quality check to determine if identified time information is in fact time information by determining if the time information changes every second (or other determined frequency) over a given interval of time and is consecutively incremented (9, 10, 11, 12) or decreased (12, 11, 10, 9). For example, if the information changes uniformly over time, it is likely that such information is time information as compared to, for example, score information. Of course, given the teachings of the present principles provided herein, other differentiations can be used to differentiate time information from score information, while maintaining the spirit of the present principles.

Once time information is determined, for example from a game clock or game clocks in one or more zones, metadata regarding the time information is then generated as described throughout these teachings. In one embodiment of the present invention, the generated metadata can then be communicated with the video program of the game. That is, the metadata generated from the determined time information can be recorded with the video in addition to timestamp information such as, for example, the PTS information in the case of MPEG-2 encoded information. Of course, the present principles are not limited to MPEG-2 information and corresponding timestamps and, thus, other coding formats can also be used in accordance with the teachings of the present principles, while maintaining the spirit of the present principles.

The determined time information and generated metadata then can be used for fulfilling requests for the presentation of certain segments of the video program based on non-absolute time of the events of the video program, for example for fulfilling a request for the last 5 minutes of a game clock of a game presented in the video content. It is to be appreciated that the preceding exemplary request is merely exemplary and should not be considered exhaustive.

In various embodiments of the present invention, filters can further be applied to the concept of determining non-absolute time information of video content. In such embodiments electronic program guide (EPG) information can be used to determine the type of event that is being broadcasted or recorded, thus further defining the type of time information for which to search. As such, in accordance with embodiments of the present invention, the application of the information used from the EPG can be used to more narrowly search for time information in video content. For example, if, using EPG information, it is determined that an event in which to search for time information is a football game, then a clock counting down from 15 minutes for every quarter can be searched for versus in a hockey game in which a clock counting down from 20 minutes for each period would be searched.

Furthermore, the use of EPG data in accordance with embodiments of the present invention, can help further distinguish a game clock which is used for determining the total length or quarters or other applicable time intervals of a game from a "shot clock" or "play clock" which is used between downs (40 seconds for American football) or possessions between different teams (24 seconds in NBA basketball). That is, a processing apparatus of the present invention can be configured to determine and distinguish between time information from, for example, two different clocks shown on a screen (game clock and a play clock). Specifically, the processing apparatus can recognize using EPG information that based on the type of event for video programming (for example, a football game), the area that keeps on repeating the same values (40 seconds for a play clock) would be a play clock while the area that keeps on being decreased in value (12:39, 12:38, 12:37) represents a game clock. This can be compared against a basketball game where the game clock can be decreased in value (10:22, 10:21, 10:20) while the shot clock is reset at a value of 24 seconds.

Figure 3:
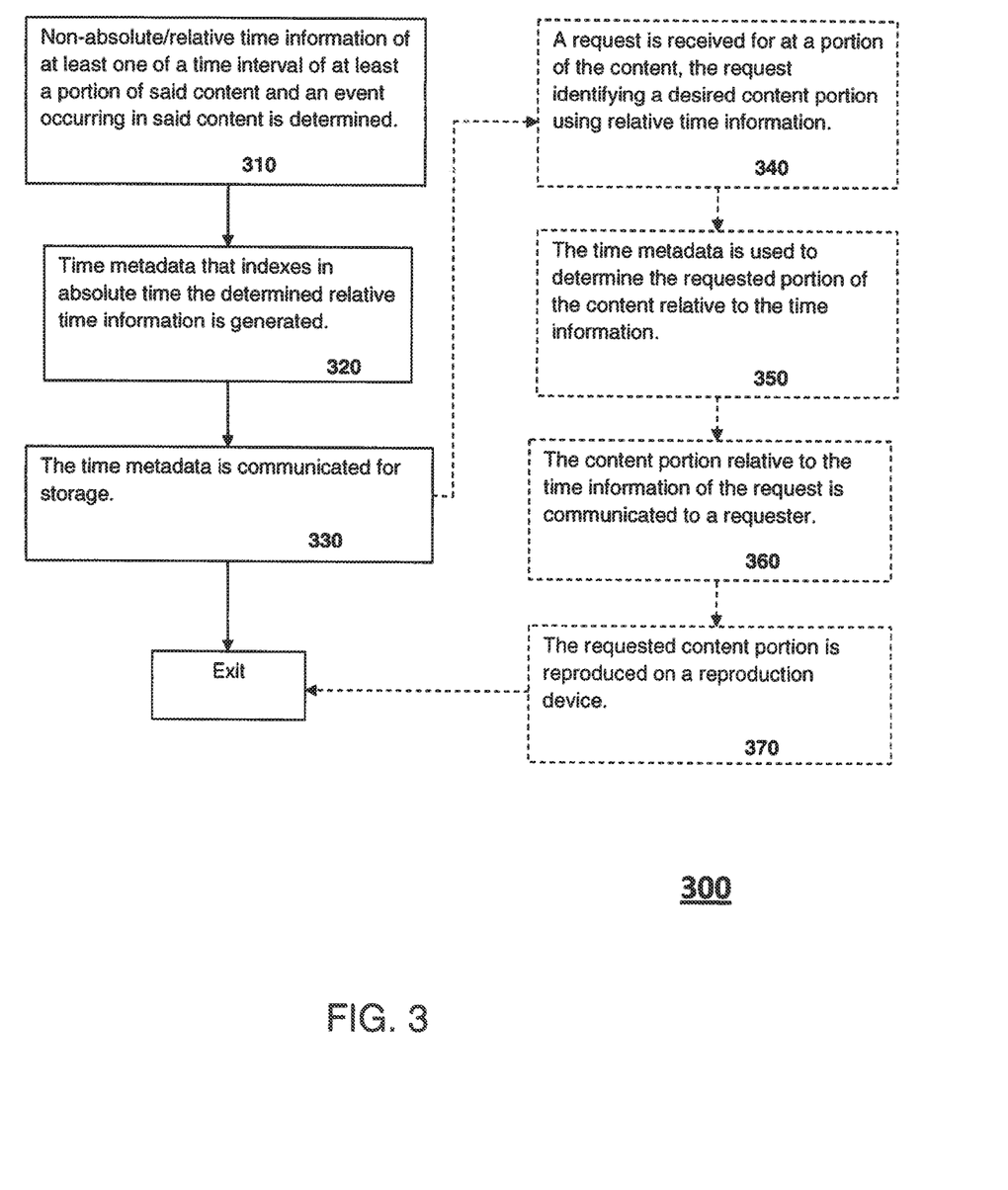
FIG. 3 depicts a flow diagram of a method for indexing content for an event based on time information, in accordance with an embodiment of the present invention.

FIG. 3 depicts a flow diagram of a method 300 for indexing content based on time information in accordance with an embodiment of the present invention.

At step 310, non-absolute time information is determined for a recorded event. For example, in one embodiment of the present invention, a user inputs non-absolute time information for content using, for example a user input device 210. In an alternate embodiment of the present invention, an optical character recognition technique is applied to a recording of an event to determine non-absolute time information from, for example, game clocks displayed in the recording of the event. The method 300 then proceeds to step 320.

At step 320, time metadata is determined that indexes at least one of, a time interval and the relative non-absolute time of an activity relating to an event in content, to absolute time. In one embodiment, the time metadata is determined from the non-absolute time information by, for example, the metadata determination device 230. The method 300 then proceeds to step 330.

At step 330, at least one of, the time metadata, the at least one predetermined time interval that is indexed based on the time metadata, the at least one predetermined activity that is indexed based on the time metadata, and the entirety of the media content depicting the event, is communicated for storage, for example, on storage device 240. As is evident, in an embodiment, the time metadata at a minimum will be stored in most cases, as the same can then be readily applied to the media content at a subsequent time in order to locate a specific time interval and/or activity relating to the event. The method 300 can then be exited. Optionally the method 300 can proceed to step 340.

At optional step 340, one or more user requests are received (e.g., via the receiver 250). The user requests can be, for example, for at least one of, at least one predetermined time interval (that is indexed based on the time metadata) and at least one predetermined event (that is indexed based on the time metadata). The user requests can even be for the entirety of the media content depicting the event (where such entirety of the content or portions thereof is/are indexed by the time metadata and, hence, a viewer, at his or her location, can then request specific portions of the event based on the indexing provided by the time metadata). The method 300 then proceeds to further optional step 350.

At optional step 350, a portion of the content relative to the time information of the request is determined using the time metadata. The method 300 then proceeds to further optional step 360.

At optional step 360, the content portion relative to the time information of the request is communicated to a requester. That is, at optional step 350 at least one of, the time metadata, at least one predetermined time interval (that is indexed based on the time metadata), at least one predetermined activity (that is indexed based on the time metadata), and the entirety of the media content depicting the event is/are transmitted to a user(s), responsive to the requests. The method 300 can then proceed to step 370.

At optional step 370, the at least one predetermined time interval that is indexed based on the time metadata and the at least one predetermined event that is indexed based on the time metadata are reproduced on a reproduction device. The method 300 can then be exited.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Having described various embodiments for a method, apparatus and system for indexing content for an event based on time information (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A system for indexing content, comprising:
a device for determining relative time information of at least one of a time interval of at least a portion of said content and an event occurring in said content;
a metadata determination device for generating time metadata that indexes in absolute time said determined relative time information; and
a transmitter for communicating the time metadata for storage, wherein
said device for determining relative time information uses electronic program guide information to identify a source of said relative time information and to identify a type of the event occurring in said content and to distinguish between two different clocks shown during the event; and
said device for determining relative time information comprises an optical character recognition device for applying an optical character recognition technique to said content, said optical character recognition device being configured to evaluate numerical information retrieved from said content to determine whether the numerical information is increasing or decreasing at a given frequency over a given time period and is consecutively incremented or decreased to determine whether the numerical information comprises relative time information.

2. The system of claim 1, wherein said device for determining relative time information comprises a user input device for enabling a user to input relative time information.

3. The system of claim 2, wherein said optical character recognition technique is focused on at least one predetermined area of said content.

4. The system of claim 1, comprising a storage device for storing at least the timing metadata.

5. The system of claim 1, comprising a receiver for receiving a request for the at least one of a time interval of at least a portion of said content and an event occurring in said content, the request identifying a desired content portion using relative time information and a request processor for processing said request.

6. The system of claim 1, wherein the relative time information is determined from one or more time apparatuses depicted in said content.

7. The system of claim 6, wherein the content encompasses a sporting event and the one or more time apparatuses comprise one or more game clocks.

8. The system of claim 1, wherein the time metadata is transmitted concurrently with said content.

9. The system of claim 8, wherein the time metadata is transmitted as part of auxiliary data transmitted concurrently with said content.

10. A method for indexing content, comprising:
determining relative time information of at least one of a time interval of at least a portion of said content and an event occurring in said content;
generating time metadata that indexes in absolute time said determined relative time information; and
communicating the time metadata for storage, wherein the determining step comprises
using electronic program guide information to identify a source of said relative time information and to identify a type of the event occurring in said content and to distinguish between two different clocks shown during the event;
applying an optical character recognition technique to said content; and
evaluating numerical information retrieved from said content to determine whether the numeral information is increasing or decreasing at a given frequency over a given time period and is consecutively incremented or decreased to determine whether the numerical information comprises relative time information.

11. The method of claim 10, comprising:
receiving a request for the at least one of a time interval of at least a portion of said content and an event occurring in said content, the request identifying a desired content portion using relative time information; and
using said time metadata to determine a portion of said content relative to the time information.

12. The method of claim 11, comprising:
communicating said content portion relative to the time information of the request to a requester.

13. The method of claim 10, comprising:
reproducing on a reproduction device at least one of, the at least one predetermined time interval that is indexed based on the time metadata and the at least one predetermined event that is indexed based on the time metadata.

14. The method of claim 10, wherein the relative time information is determined from one or more time clocks in said content.

15. The method of claim 14, wherein the content comprises a sporting event and the one or more time clocks are one or more game time clocks.

16. The method of claim 10, wherein the time metadata is transmitted concurrently with said content.

17. The method of claim 10, wherein the time metadata is transmitted as part of auxiliary data transmitted concurrently with said content.

18. The method of claim 10, comprising:
applying an optical character recognition technique to determine the relative time information.

19. The method of claim 18, wherein the optical character recognition technique is configured to evaluate numerical information provided from one or more pre-designated areas in a presentation of said content.

20. The method of claim 10, wherein said relative time information is determined from a user input.

21. A non-transitory computer readable storage medium comprising a computer readable program for indexing content, wherein the computer readable program when executed on a computer causes the computer to perform the following steps:
determining relative time information of at least one of a time interval of at least a portion of said content and an event occurring in said content;
generating time metadata that indexes in absolute time said determined relative time information; and
communicating the time metadata for storage, wherein the determining step comprises
using electronic program guide information to identify a source of said relative time information and to identify a type of the event occurring in said content and to distinguish between two different clocks shown during the event;
applying an optical character recognition technique to said content;

evaluating numerical information retrieved from said content to determine whether the numeral information is increasing or decreasing at a given frequency over a given time period and is consecutively incremented or decreased to determine whether the numerical information comprises relative time information.

22. The non-transitory computer readable storage medium of claim 21, comprising:

receiving a request for the at least one of a time interval of at least a portion of said content and an event occurring in said content, the request identifying a desired content portion using relative time information;

using said time metadata to determine a portion of said content relative to the determined time information; and communicating said content portion relative to the determined time information to a requester.

23. An apparatus for indexing content, comprising:

a memory for storing at least program routines and data; and a processor for executing said program routines;

said apparatus being configured to:

determine relative time information of at least one of a time interval of at least a portion of said content and an event occurring in said content;

generate time metadata that indexes in absolute time said determined relative time information; and communicate the time metadata for storage, wherein the operation of the apparatus to determine relative time information comprises using electronic program guide information to identify a source of said relative time information and to identify a type of the event occurring in said content and to distinguish between two different clocks shown during the event;

applying an optical character recognition technique to said content; and evaluating numerical information retrieved from said content to determine whether the numeral information is increasing or decreasing at a given frequency over a given time period and is consecutively incremented or decreased to determine whether the numerical information comprises relative time information.

24. The apparatus of claim 23, wherein said apparatus is configured to:

receiving a request for the at least one of a time interval of at least a portion of said content and an event occurring in said content, the request identifying a desired content portion using relative time information; and using said time metadata to determine a portion of said content relative to the time information.

25. The apparatus of claim 23, wherein said apparatus comprises an integrated component of at least one of a device for determining relative time information, a metadata determination device, a receiver and a request processor.

* * * * *